United States Patent
Sprenger et al.

(10) Patent No.: US 11,783,516 B2
(45) Date of Patent: *Oct. 10, 2023

(54) METHOD FOR CONTROLLING DIGITAL FEATHER GENERATIONS THROUGH A USER INTERFACE IN A COMPUTER MODELING SYSTEM

(71) Applicant: Unity Technologies SF, San Francisco, CA (US)

(72) Inventors: Christoph Sprenger, Wellington (NZ); Matthias Baas, Wellington (NZ)

(73) Assignee: Unity Technologies SF, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,522

(22) Filed: May 27, 2022

(65) Prior Publication Data

US 2023/0056110 A1    Feb. 23, 2023

Related U.S. Application Data

(63) Continuation of application No. 17/459,658, filed on Aug. 27, 2021, now Pat. No. 11,348,286.

(60) Provisional application No. 63/235,614, filed on Aug. 20, 2021.

(51) Int. Cl.
*G06T 11/00* (2006.01)

(52) U.S. Cl.
CPC .......... *G06T 11/00* (2013.01); *G06T 2200/24* (2013.01)

(58) Field of Classification Search
CPC .............................. G06T 11/00; G06T 2200/24
See application file for complete search history.

(56) References Cited

U.S. PATENT DOCUMENTS

| | | |
|---|---|---|
| 2003/0179203 A1 | 9/2003 | Bruderlin et al. |
| 2005/0012746 A1 | 1/2005 | Chen et al. |
| 2011/0216074 A1* | 9/2011 | Witkin ................... G06T 13/40 345/473 |
| 2018/0240262 A1* | 8/2018 | Hagedoorn ............. G06T 13/80 |

OTHER PUBLICATIONS

Ijiri et al. "The Sketch L-System: Global Control of Tree Modeling Using Free-Form Strokes," Smart Graphics Lecture Notes in Computer Science, 2006, pp. 138-146, Springer, Berlin, Germany.
Lintermann et al. "Interactive Modeling of Plants," IEEE Computer Graphics and Applications, IEEE Service Center, 1999, pp. 56-65, vol. 19, No. 1, New York, NY.

* cited by examiner

*Primary Examiner* — Michelle Chin
(74) *Attorney, Agent, or Firm* — Haynes and Boone, LLP

(57) ABSTRACT

A realistic feather generation may be represented via a user interface in a modeling system. To perform the feather generation, a curve defining a spine of a feather is received from input to the user interface of the modeling system. The feather is created in the user interface based at least on the curve, where the feather includes barbs extended away from the spine of the feather in one or more directions. The feather is deformed based on one or more deformation parameters. A feather contour of the barbs along at least one of the one or more directions is generated based on a contour parameter defining the feather contour. A barb density for a number of the barbs along the spine of the feather is established based on a barb density parameter. Thereafter, a data structure representing the feather is generated.

20 Claims, 10 Drawing Sheets

METHOD FOR CONTROLLING DIGITAL FEATHER GENERATIONS THROUGH A USER INTERFACE IN A COMPUTER MODELING SYSTEM

CROSS-REFERENCE TO RELATED APPLICATION

This application is a continuation of U.S. patent application Ser. No. 17/459,658, filed Aug. 27, 2021, which claims priority to and the benefit of U.S. Provisional Patent Application No. 63/235,614, filed on Aug. 20, 2021, the contents of which are hereby incorporated by reference in their entirety.

FIELD

The present disclosure generally relates to computer animation and tools for specifying objects in a virtual scene from which computer-generated imagery is to be modeled and more particularly to user interfaces and tools for specifying procedurally-generated digital feathers and other similar objects.

BACKGROUND

In computer-generated image generation and animation, of images and/or video sequences, there might be a desire to place and animate particular objects. In a detailed virtual scene, it could be tedious to individually place each desired object in the virtual scene. Furthermore, if each desired object is placed manually, later revisions of the scene might also be tedious to modify, as it might require an animation artist to move a large number of items, such as individual barbs or fibers along a feather and/or individual feathers on a bird-like creature, while having a visually pleasing result. Objects that comprise plumage or the like on a shell or surface of a creature (e.g., a person, character, animal, imaginary or fictional creature, and the like), can comprise many individual objects. For example, a creature may have features on their surface including feathers, hairs, fur, and the like, where each object may have individual shapes, sizes, parameters, and placements on the surface.

For simple cartoons, modeling or drawing these individual objects might not be difficult. However, as viewers have come to expect more complex visuals, there is a need for a procedural generation and placement of the objects in a realistic fashion, which can be driven by a computer process instead of requiring an artist to create and manage each object manually. Some of that computer-driven creature generation might rely on simulation and models to perform more realistic object generation, movement, and animation.

SUMMARY

According to some embodiments, a computer-implemented method for generating data realistically representing a feather via a user interface (UI) in a modeling system (e.g., a two-dimensional (2D) or a three-dimensional (3D) (computer modeling and/or animation system) for use in computer animation may include, under the control of one or more computer systems configured with executable instructions, receiving, from an input to the UI of the modeling system, a curve defining a spine of a feather, creating the feather in the UI based at least on the curve, wherein the feather comprises barbs extended in two directions along the spine of the feather, deforming the feather based on one or more deformation parameters received via the UI, generating a feather contour of the barbs along at least one of the two directions based on a contour parameter defining the feather contour received via the UI, establishing a barb density for a number of the barbs along the spine of the feather based on a barb density parameter received via the UI, and generating a data structure representing the feather based on the deformed feather, the feather contour, and the barb density.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the feather computation method, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which.

DETAILED DESCRIPTION

Figure 1:
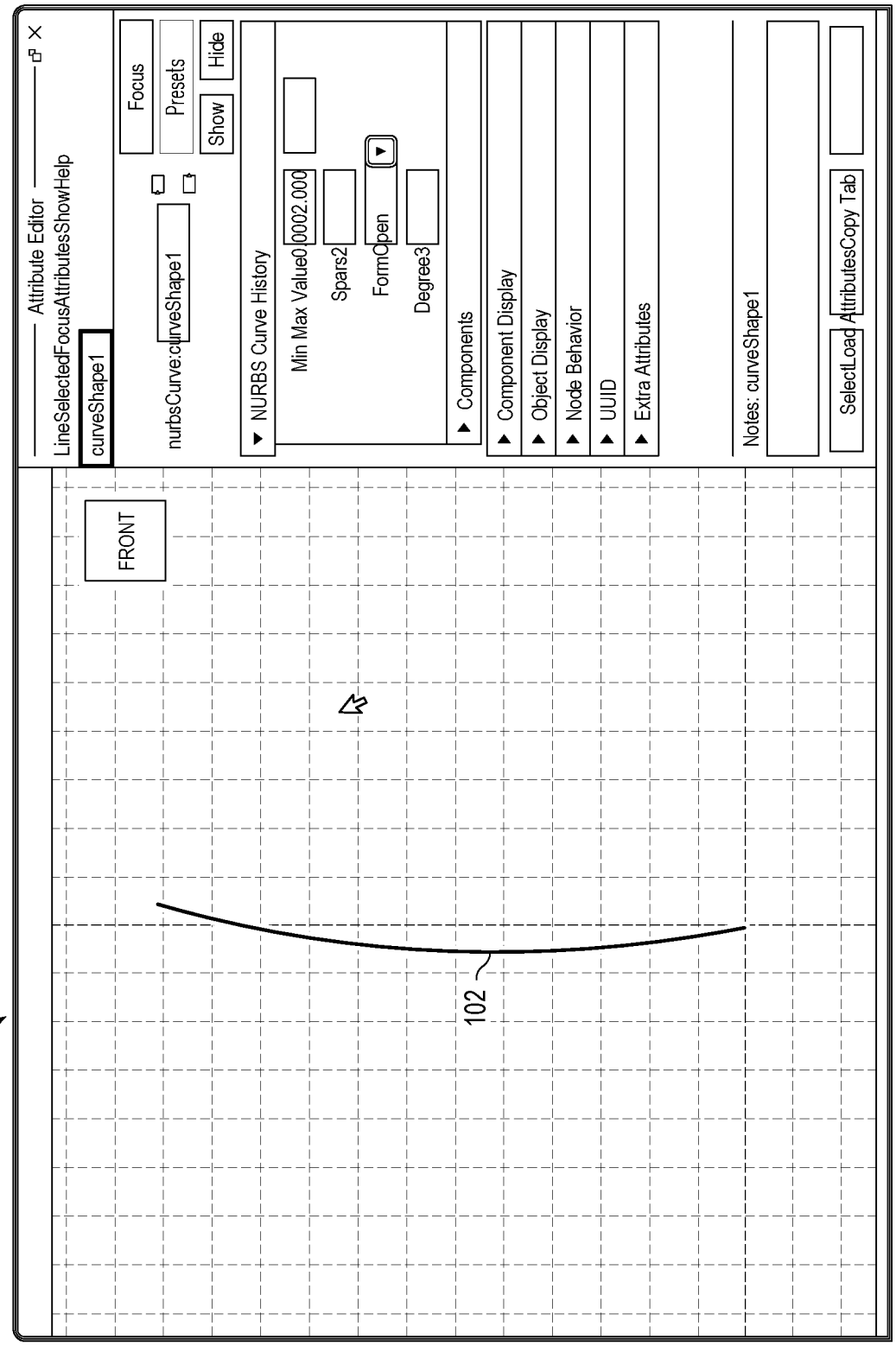
FIG. 1 illustrates a user interface where a spine of a feather may be represented by a curve input via the user interface, in an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Computer simulation that is used for feather generation may be used to animate natural characteristics and movements of characters and creatures (e.g., humans, animals, fictional or fantastical creatures, and the like), such as by using a physics engine to output animations and movements of an articulated creature that are consistent with real-world physics and joint constraints. This may be done through one or more algorithms that attempt to automate this process of animating surfaces, objects on surfaces, body parts, and the like. For example, computer modeling, simulation, and animation may be used to animate objects on a surface of a character by taking one or a subset of objects on the surface and attempting to place other similar objects on the surface through interpolations and other algorithmic approaches. With small or simple objects, this may require determining how to create natural-looking surfaces and surface objects of at most a few dozen attached objects on the surface. For other simulations, such as those with flexible objects, bird grooms, animal coats or pelts, and the like, the number of degrees of freedom of individual units is much greater and typically computer simulation requires a trade-off between realism, resolution, and amount of computing resources available. Because of this trade-off, efficient computer simulation techniques can be important as they might allow for an increase in realism and/or resolution without requiring significant increases in computing resources. Thus, by utilizing solutions provided herein, computing resources may be conserved, and processing times may be reduced.

Characters and creatures that are generated and animated can be created in computer-readable form procedurally or manually. For example, an image of a sphere might be generated procedurally from a user input of a center location, a radius parameter, and a color. In another example, a more complex object might be generated procedurally from a set of parameters and a set of procedural rules for object creation. Objects might also be created manually, such as by having an artist draw into a computer system the shape of an object. In some cases, an artist might manually adjust a procedurally-generated object and place external objects on that surface (e.g., feathers, hairs, fur, etc., on a skin of a character or animal). However, simulation computations involving many objects, such as a groom of feathers on a bird, may require multiple different types, sizes, shapes, and looks of individual feathers. Further, the simulation of a single feather may have many different components, including many individual barbs or fibers extending from a spine or line of the feather.

For a realistic feather generation, an initial feather parameter may be provided as input to a computer modeling and animation system for 3D characters and creatures (e.g., humans, animals, fictional creatures, and the like). The feather parameters include multiple different features, such as sizes, colors, and/or styles, some of which may be guide feathers used to interpolate and/or estimate the size, shape, deformations, and the like of nearby feathers (e.g., those other feathers that may be automatically generated nearby or between the guide feather(s)). Each feather may be represented by a corresponding subdivided lattice such that each feather may be embedded and deformed in the corresponding creature's modeling by the feather's respective lattice. By having this procedurally generated, later revisions of a set of a large number of feathers (or other elements that might behave like feathers) can be easily generated by modifying procedural inputs and rerunning a feather generation process rather than modifying feathers individually.

In order to procedurally generate feathers, an improved UI may be provided where feather parameters and data specifications for feathers may be easily selected, changed, and viewed for feather generation. The generated feather may correspond to a "hero" or guide feather, which is used for procedural generation of other feathers when placed on a groom. Although feathers are described herein, the improved UI may also be used for different types of fibers and surface objects. Such surface objects may include hair, fur, textured surface patterns, flowers, trees, plants, and other types of surface objects that may protrude from a surface and may include numerous surface objects within an area or pattern over the surface. The UI may include one or more UI widgets, tools, input fields, menus, and/or adjustable parameters (e.g., slide tools and the like). Further, the UI may have and/or provide one or more windows within the UI that allow for data input and manipulation, such as by adjusting parameters and other data representations within the UI.

When procedurally generating a feather used within a groom, such as a guide feather used for interpolation of nearby feather shapes, sizes, and surface placements, the improved UI may utilize a curve or 2D line representing a spine of the feather. In some embodiments, the curve of the feather spine may be defined based on a spline that is defined from user inputs to the UI, for example, by selecting two or more points and allowing procedural generation of the curve or spline by defining one or more mathematical parameters to cause the spine to curve or otherwise bend in one or more directions. Once the curve for the spine is defined, data specifications for barbs along the spine may be retrieved and loaded. For example, the number and/or appearance of the barbs may be based on the length and/or curvature of the spine, as well as a specification of the desired look or appearance of the feather (e.g., based on template feathers, number of desired barbs, and the like). The feather may be created, and the UI may load, an initial digital representation of the feather in two or three dimensions within the modeling system.

Once the initial feather is created and represented in the improved UI, one or more UI widgets or tools may be used to deform, contour, and adjust the feather for a final representation used as the guide feather. In this regard, a UI widget may allow for 2D or 3D input to portions of the feather, such as a tip of the feather or a base of the feather, as well as along the spine of the feather. The UI widget may also allow for input of selections nearby or proximate to the feather that cause interpolation and adjustment of the feather in the UI. These inputs may be used to move such locations with the 2D or 3D space represented by the UI of the modeling system. Each input may correspond to a deformation of the feather within the 2D or 3D space, such as by changing the representation of the spine of the feather (e.g., the parameters or function for the spline representing the feather spine). The UI widget may be represented as one or more graphical icons or representations in the UI, such as a 2D or 3D graphical representation having a current selection. In other embodiments, the deformations may also be received through textual input through a widget of the UI, such as by changing one or more coordinates of a point or area of the feather within the UI.

Based on the received deformations, the curve of the feather is then deformed in the improved UI. The UI may then provide one or more UI widgets, tools, or windows to contour sides of the feathers having the barbs extended from the spine. For example, the barbs of a feather may extend in two opposite, or approximately opposite, directions. These barbs may extend in this direction along the spine from the base, or approximately the base, to the tip, or approximately the tip. In realistic feather generation and growth, the barbs may extend or shrink at different points or areas along the feather from base to tip. For example, at or nearby the base of the feather, the barbs may thicken or swell, while tapering off at or nearby the tip of the feather. Further, different areas may shrink or swell. As such, the UI may provide a window or interface field, as well as a tool and/or input field, that may further define a contour along one or more edges of the barbs. The input may correspond to another curve or spline that may define the contour along the side(s) of the barbs. This may correspond to a 2D representation of an outer shape of the feather's barbs, which travels the length of the feather's spine. However, other inputs, such as textual inputs and/or tool inputs, may also be used to for provide contour parameters.

When applying a contour, a curl to the barbs may also be received via the improved UI, which may correspond to a curvature of the barbs in a uniform direction along the spine. For example, in a 3D modeling system, the curl may deform the barbs in a z-axis direction with a curvature (where the spine is defined along the x and y-axes). Thus, the curl may be entered as a 2D curvature that indicates a uniform direction of a curl for the feather's barbs. Thereafter, the contour and curl may be procedurally applied to the feather and displayed in the improved UI.

In order to finalize a digital representation of the feather and create a data representation usable for generating and modeling a groom of feathers, a density, or conversely sparseness, of the barbs may be designated via the improved UI. In some embodiments, an overall barb density may be entered as a number or denseness of the barbs for all barbs along the feather. However, using a window, as well as a tool and/or input field, barb density may be adjusted along different locations and areas of the feather in the modeling system. For example, a curve or spline may be provided as input that increases and/or decreases barb density along the feather. The curve or spline for the barb density may therefore be a 2D representation of changes in density traveling along the spine of the feather, such as along a main axis associated with the spine. Once barb density is established, a data structure for the feather may be created and stored for use as a guide feather. Further, the data structure allows for additional adjustment for barb density as required for different feathers and/or feather grooms.

When utilizing the data structure for the feather, a surface, such as a manifold of a 3D character or creature in a modeling system, may be used to determine placements of feathers over the manifold. Using the surface definitions of the inner and outer manifolds, the computer animation system may regrow the feathers by attaching each feather's base to an attachment point on the manifold, and extending the feather toward one or more other selected points, directions, or areas. An angle of an attachment point may correspond to an angle of growth of the feather to a desired direction. Selection of the attachment points' placement on the manifold may be done randomly but may also consider feather size and shape in order to prevent collisions and intersections between digitally represented feathers. Local penetrations of feathers with other feathers may be observed from feather lattice resolutions. The proximity of each feather may therefore be both random but constrained by size and shape of the feather from the data structure. Thus, per feather or per groom constraints may be enforced during growth of the feathers to cause the feathers' shapes and sizes to be consistent with the initial feather groom and prevent intersections. This allows for controlling and rigging the animation of the groom to control movements of the feathers in the feather groom.

FIG. 1 illustrates a UI 100 where a spine of a feather may be represented by a curve input via the user interface, in an embodiment. As illustrated there, UI 100 may be displayed by a computing device and computing display when generating and modeling feathers for a 3D creature, such as a human, animal, fictional creature, or the like. For example, the computing system may correspond to a computer modeling and animation system configured to generate feathers utilized on a shell, surface, or manifold of a creature (e.g., a body, clothing, armor, or other artifact having a surface associated with the creature). In order to generate such feathers, a digital representation of a computer animation of a feather may be generated in UI 100.

In UI 100, a curve 102 is provided through input to UI 100 when initially modeling a feather within a 2D or 3D computer modeling and animation system. Curve 102 may be defined using a mathematical relationship between two or more points. In this regard, UI 100 may accept input from a user, such as an artist or computer animator, via one or more UI widgets, tools, fields, or windows. An initial start point and end point may at least be required for curve 102. Curve 102 may be procedurally generated after initial input, or additional input parameters may be received for the shape and/or curvature of curve 102. Although curve 102 is shown with a single curvature, in more complex feather modeling, multiple curvatures or directional segments to curve 102 may also be used.

Figure 2:
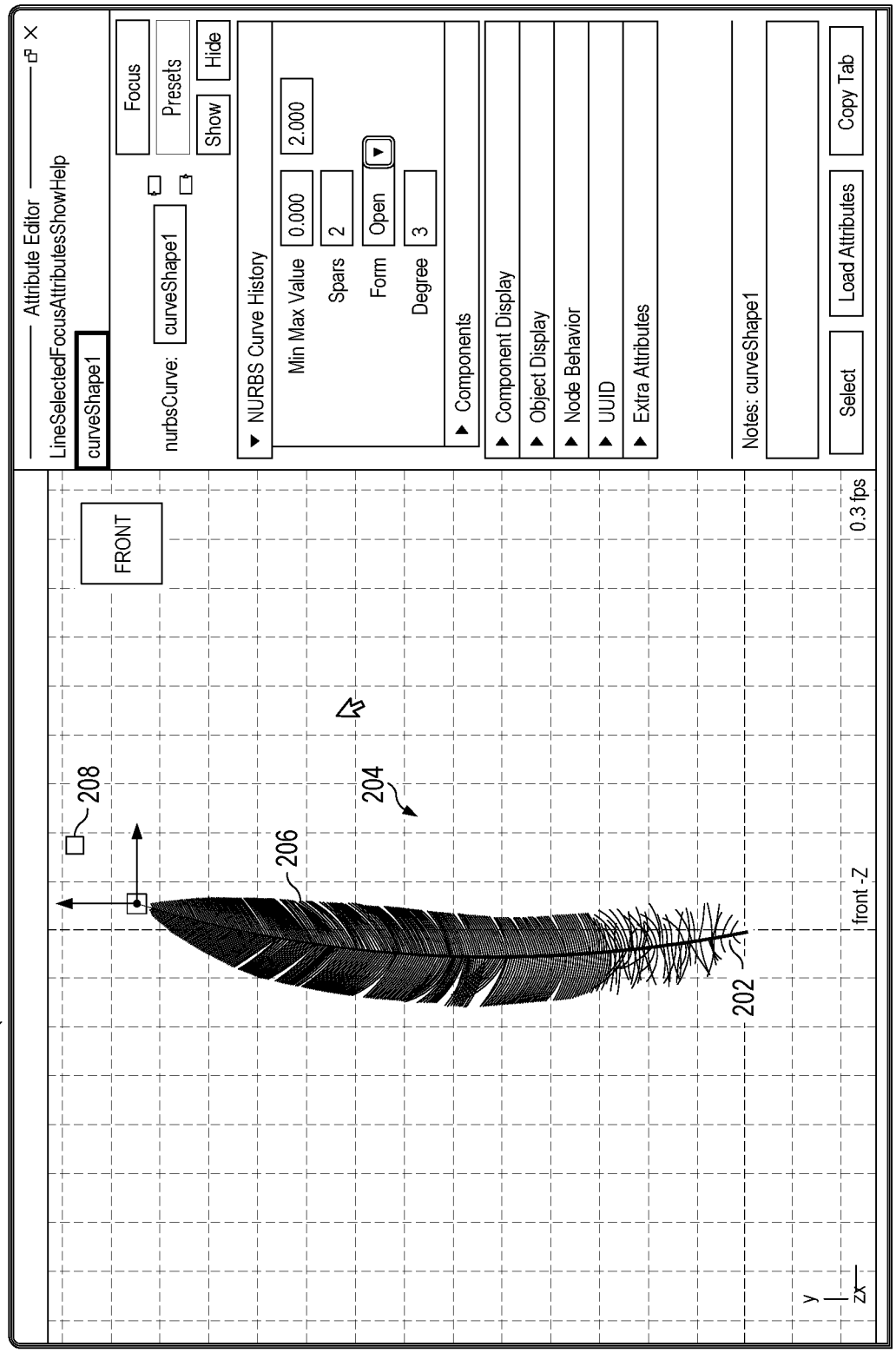
FIG. 2 illustrates a user interface where a feather may be grown and deformed using a user interface widget of the user interface, in an embodiment.

For example, a spline may be used to define curve 102. The spline may be a polynomial curve in 2D or 3D space. In some embodiments, the spline may be a cubic spline comprising a plurality of segments between points on the spline, where each segment is a third-degree polynomial. The cubic spline may be a bicubic spline usable to interpolate data points into pixels for curve 102. The spline may begin at the start point and may end at the end point, which may be interchangeable. The curvature of the spline may be specified by inputs from the user viewing UI 100. For example, textual inputs (e.g., through a keyboard or touch screen interface) may be used, or input may be received through manipulation of a cursor (e.g., through mouse and/or touch screen movements). Curve 102 may be used to define a spine or middle section of a feather, from which the barbs or other fibers extend in an outward direction. The spline may also be referred to as a shaft, centerline, or the like of a computer modeled and animated feather, which designates the portion used for placement of barbs or other fibers, as shown in FIG. 2. In the general case, the spline might be represented in computer memory as having a specific position and orientation and/or follow a particular path in 2D coordinates or 3D coordinates. The representation might be in the form of definitions of a mathematical expression and/or piecewise linear or nonlinear curve portions. As such, the spline representation might represent, or be referred to as, a center, a centerline, and/or a center control curve. The spline might correspond to a surface object.

FIG. 2 illustrates a UI 200 where a feather may be grown and deformed using a UI widget of the user interface, in an embodiment. As illustrated there, UI 200 may be displayed by a computing device and computing display when generating and modeling feathers for a 3D creature, such as a human, animal, fictional creature, or the like. For example, the computing system may correspond to a computer modeling and animation system configured to generate feathers utilized on a shell, surface, or manifold of a creature (e.g., a body, clothing, armor, or other artifact having a surface associated with the creature). In order to generate such feathers, a digital representation of a computer animation of a feather may be generated in UI 200 based on curve 102 in UI 100 of FIG. 1. Thus, UI 200 may show a progression of the improved UI when modeling a feather for use in computer animation.

In this regard, curve 102 is converted to spine 202 for a feather 204 in UI 200. UI 200 may display procedural generation of feather 204 based on data specifications for different feather types, sizes, shapes, and the like, which may be selected and/or modified based on input parameter for desired feather types, sizes, shapes, and/or the like. For example, a database having data specifications and structures representing different parameters for spine 202 may be accessed, and that data may be retrieved. The data may be used to generate a shape and color of spine 202. Similarly, the data may be used to generate barbs 206, which extend in two directions away from spine 202 in an angular manner. At least one or more directions of extension away from spine 202 for barbs 206 may be required. For example, at or near a base of spine 202, barbs 206 may extend perpendicularly or approximately perpendicularly. However, the angular extension of barbs from spine 202 may decrease as barbs 206 approach a tip of spine 202. Barbs 206 may also be defined, in numerosity, density, and/or sparseness, based on initially selected feather parameters and/or data specifications, but may further be adjusted later. Although barbs are referred to herein, other structures extending away, along, or with a spine or other center may also be used in place of "barbs." For example, structures may correspond to extensions or protrusions from a spine or other center of a surface object.

In order to define a data structure for feather 204, the digital representation of feather 204 may have features and properties within a lattice that allow for deformation of feather 204 during generation. For example, feather 204 may include a lattice having subdivisions that define the individual features and properties of feather 204. Feather 204 may have a base of spine 202 at a bottom or origin of the lattice, which then extends to a tip of spine 202 at another end of the lattice. Within the lattice, feather 204 may therefore include properties and features that may be animated and deformed when growing feather 204. Spine 202 may have a curvature and other 3D configuration that has the appearance of a real-life feather. A data structure for feather 204 may then correspond to the lattice, where feather 204 is generated and animated using the lattice. Each subdivision within the structural lattice allows for assigning different properties to feather 204, including color, shape, curvature, barb density and the like, which may be used for procedural generation of the feather in FIGS. 3-5.

The curvature of spine 202 may depend on different subdivisions, such as being straighter at or nearby a base and curving more as extended toward a tip. In this regard, spine 202 may include one or more points, areas, or localities where the curvature of spine 202 may change. This may allow for deformations of spine 202, and feather 204 overall, utilizing a UI widget 208. UI widget 208 may be placed on a point, area, or locality along spine 202 so that further input, such as mouse movements or keyboard inputs, may allow moving of the particular point in two or more dimensions. For example, UI widget 208 is shown with a vertical and horizontal axis allowing for movement in a vertical and/or horizontal direction to deform feather 204. Deformation of feather 204 may change curvature of spine 202 by changing a placement of the selected point of spine 202 within UI 200 in some degree of range. In some embodiments, deformation of feather 204 using UI widget 208 may be performed by changing the coordinates of the selected point within a graphical representation shown by UI 200. When deforming feather 204 by changing spine 202 using UI widget 208, constraints may be enforced. For example, a curvature may be maintained overall for spine 202. In further embodiments, one or more points along spine 202 may be fixed and/or mathematical representations of spine 202 may be constrained or enforced. For example, with a spline, certain points in the spline may be constrained or locked so that deformation of the point of spine 202 selected by UI widget 208 may only change a portion of the mathematical representation of the corresponding spline. Deformations performed using UI widget 208 may be received as deformation parameters from user input via UI 200.

Figure 3:
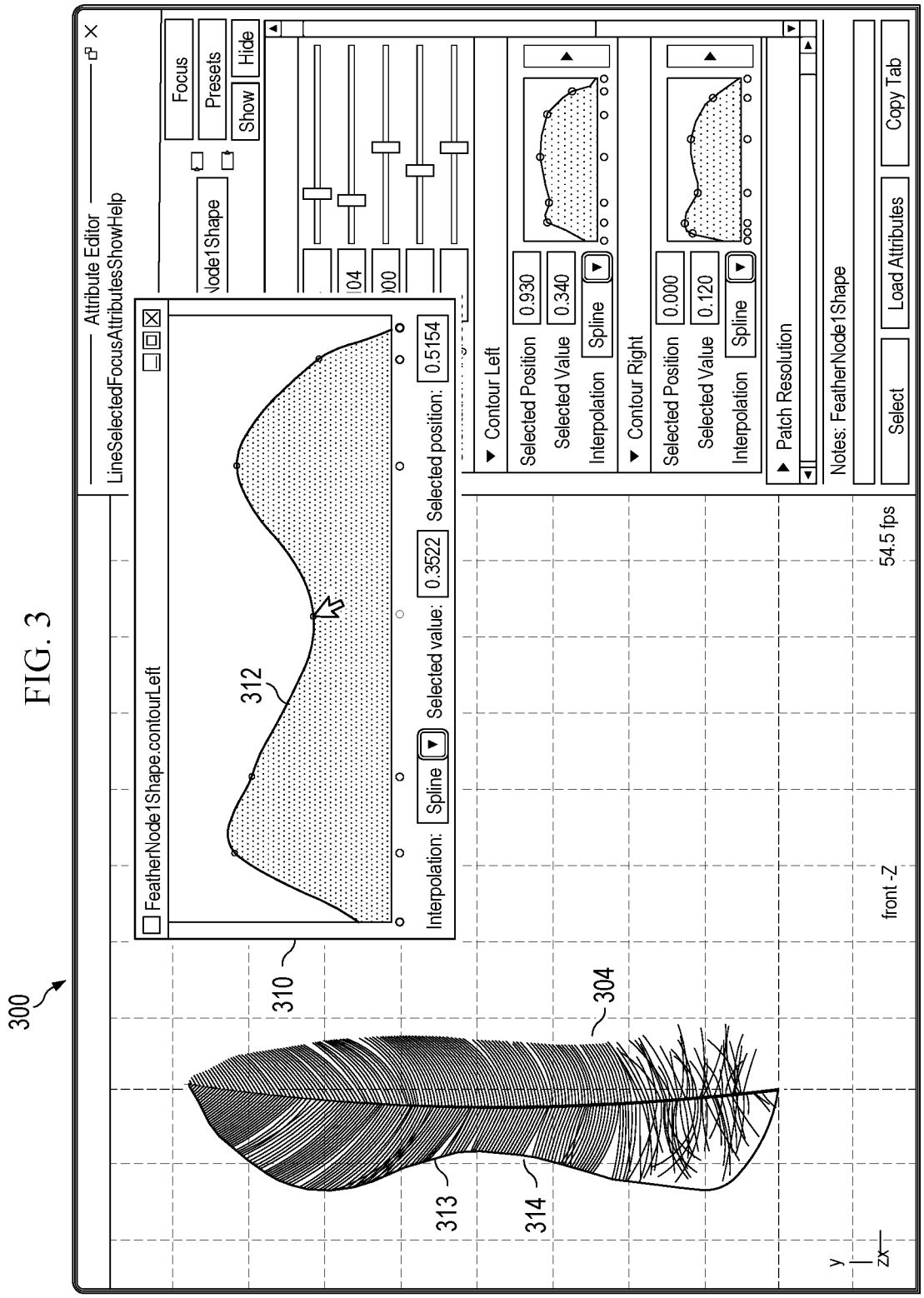
FIG. 3 illustrates a user interface where a contour of a feather may be defined using an input via the user interface, in an embodiment.

FIG. 3 illustrates a UI 300 where a contour of a feather may be defined using an input via the UI, in an embodiment. As illustrated there, UI 300 may be displayed by a computing device and computing display when generating and modeling feathers for a 3D creature, such as a human, animal, fictional creature, or the like. For example, the computing system may correspond to a computer modeling and animation system configured to generate feathers utilized on a shell, surface, or manifold of a creature (e.g., a body, clothing, armor, or other artifact having a surface associated with the creature). In order to generate such feathers, a digital representation of a computer animation of a feather may be generated in UI 300 based on feather 204 in UI 200 of FIG. 2. Thus, UI 300 may show a further progression of the improved UI when modeling a feather for use in computer animation, such as when adding contouring to barbs on one or more sides of a feather 304 in UI 300.

In improved UI 300, feather 304 may be further procedurally generated utilizing a contouring window 310. Contouring window 310 allows for simplified input and contouring of a large number of barbs quickly and with fewer inputs. In this regard, contouring window 310 allows for entry of 2D input, shown as a contour curve 312, which allows for contouring of the barbs on one or more sides of feather 304. Contour curve 312 may therefore correspond to a curve, spline defined by two or more points and a polynomial or other mathematical relationship. This may coincide with and/or affect the look of feather 304 based on contour curve 312. Contour curve 312 define an outer shape or contour lines that make up the barbs for feather 304 within the corresponding lattice structure. An on-feather contour curve 313 may similarly correspond to the outer shape and/or contour lines that define and/or are used to adjust the barbs for feather 304 that extend away from a spine or other center line or curve of feather 304.

For example, the area under contour curve 312 may correspond to the desired shape of the corresponding barbs at the same locations along the horizontal axis for feather 304. The vertical axis may therefore be used to define a shape or contour of feather 304 at the corresponding location along the horizontal axis. Similarly, on-feather contour curve 313 may be used to define and/or adjust the shape of the corresponding barbs at the same locations along the horizontal axis for feather 304. This may be done by adjusting and/or placing on-feather contour curve 313 in alignment with the desired look and/or contouring of barbs for feather 304. Different control points or the like may be placed along contour curve 312 and/or on-feather contour curve 313 in order to adjust the corresponding curves, lines, or other data representations that correspondingly adjust a contour of feather 304.

In order to procedurally generate barbs in accordance with contour curve 312 and/or on-feather contour curve 313, one or more barbs that extend from the spine of feather 304 may be adjusted. The barbs may have their length and/or curvature constrained and/or modified by contour curve 312 and/or on-feather contour curve 313. Each of the barbs may have a specific curve, or the barbs may be interpolated between similar and/or nearby barbs having a specific curve. For example, a barb near a base may extend generally in a perpendicular fashion from the spine of feather 304 and have a relatively flat curvature defined in length by contour curve 312 and/or on-feather contour curve 313. As barbs move closer to a tip of feather 304, the curvature of the barbs may become more severe, and the angular direction extending from the spine of feather 304 may be reduced, in order to point toward the tip. However, modifying contour curve 312 and/or on-feather contour curve 313 may cause the corresponding barbs to change in curvature and/or angular direction when extended from the spine of feather 304. Thus, contour curve 312 in contouring window 310 and/or on-feather contour curve 313 in UI 300 along feather 304 may be dynamically adjusted, which causes dynamic procedural generation of feather 304.

Figure 4:
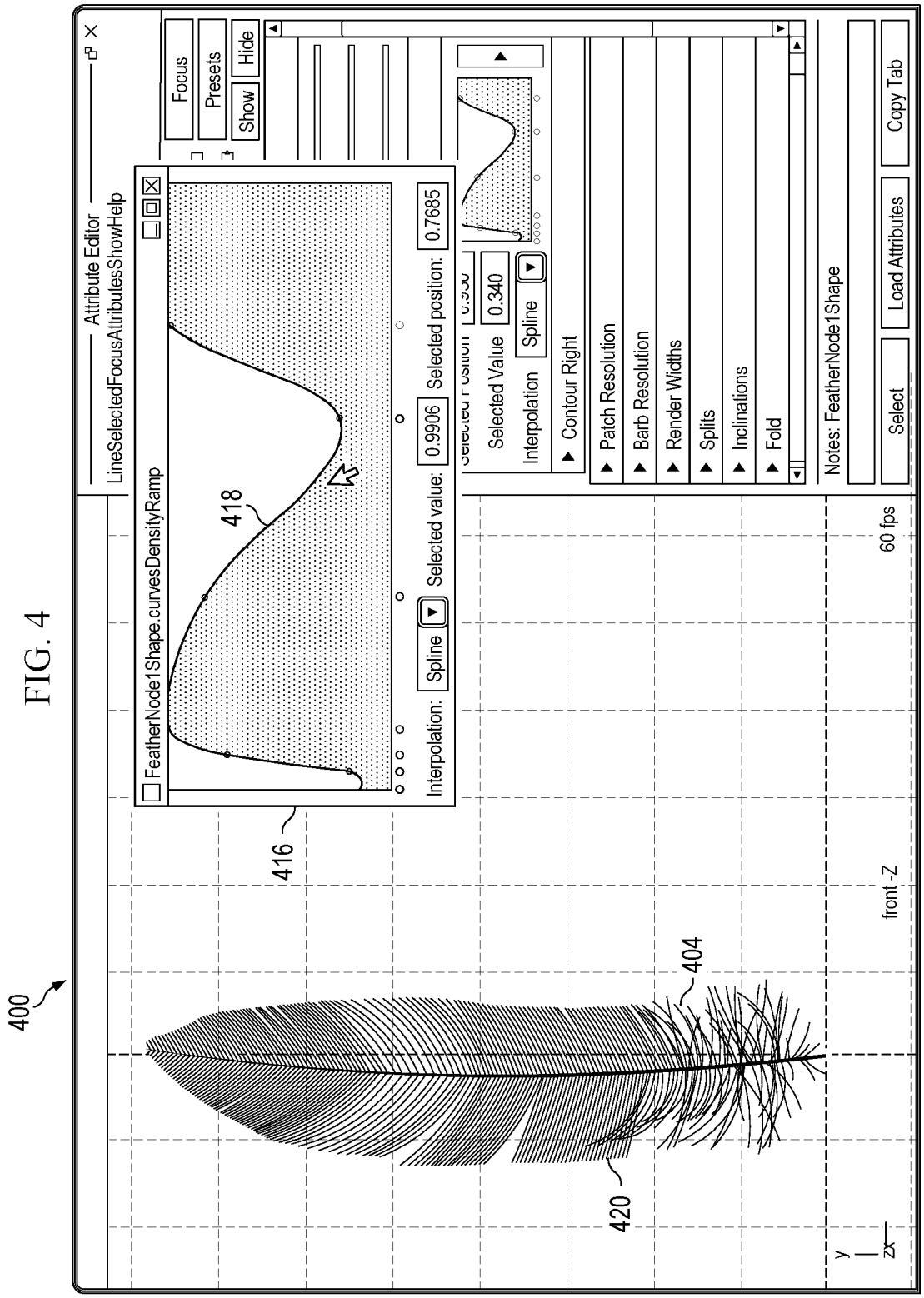
FIG. 4 illustrates a user interface where a feather density of a feather may be defined using an input via the user interface, in an embodiment.

FIG. 4 illustrates a UI 400 where a feather density of a feather may be defined using an input via the UI, in an embodiment. As illustrated there, UI 400 may be displayed by a computing device and computing display when generating and modeling feathers for a 3D creature, such as a human, animal, fictional creature, or the like. For example, the computing system may correspond to a computer modeling and animation system configured to generate feathers utilized on a shell, surface, or manifold of a creature (e.g., a body, clothing, armor, or other artifact having a surface associated with the creature). In order to generate such feathers, a digital representation of a computer animation of a feather may be generated in UI 400 based on feathers 204 and 304 in UIs 200 and 300 of FIGS. 2 and 3. Thus, UI 400 may show a further progression of the improved UI when modeling a feather for use in computer animation, such as when adjusting barb density of barbs on one or more sides of a feather 404 in UI 400

In improved UI 400, feather 404 may be further procedurally generated utilizing a barb density window 416. Barb density window 416 allows for simplified input to quickly adjust and change a number, density (e.g., number within an area), sparseness, and/or thickness/thinness of individual fibers for a large number of barbs along feather 404 quickly and with fewer inputs. In this regard, barb density window 416 allows for entry of 2D linear input, shown as a density curve 418 within barb density window 416, which allows for adjusting the barb density at different points along an axis of feather 404. As previously discussed, the "barb density" may change different parameters of the barbs along feather 404. For example, a barb density may change one of more of a number of barbs overall or a number per location, area, or section of feather 404, a sparseness of the barbs and/or removal factor of previously placed barbs, and/or a fiber thickness or thinness of each corresponding barb. For example, a barb density may refer to individual barbs or clumps of barbs. A clump of barbs may correspond to multiple barbs, such as a number of barbs found in an area, section, or grouping along feather 404. Such clump of barbs may be defined or determined based on their placement or locality along feather 404. In a data structure that corresponds to a plurality of barbs that are to be defined as members of a clump, that plurality of barbs might be defined such that user inputs or procedural inputs that are input with respect to a clump are inputs that are applied collectively to each barb of that clump. For example, an input instruction to shorten a clump might be one input instruction and might be applied by a feather processor as a shorten operation on each barb of that clump.

Similar to contour curve 312, density curve 418 may correspond to a curve, spline defined by two or more points and a polynomial or other mathematical relationship. This may coincide with and/or affect the look of feather 404 based on density curve 418 by instead changing the density of the barbs in different locations or areas along feather 404. Density curve 418 may therefore define the density, as discussed above, of the barbs within area of the corresponding lattice structure. For example, the area under density curve 418 may correspond to the desired density of the barbs at the same locations along the horizontal axis for feather 404. Therefore, the vertical axis may be used to define a corresponding density of barbs for feather 404 at the corresponding location along the horizontal axis. In further embodiments, another curve, line, or data representation, similar to on-feather contour curve 313, may be used to adjust barb density directly in UI 400, such as by adjusting with the barbs of feather 404.

Figure 5:
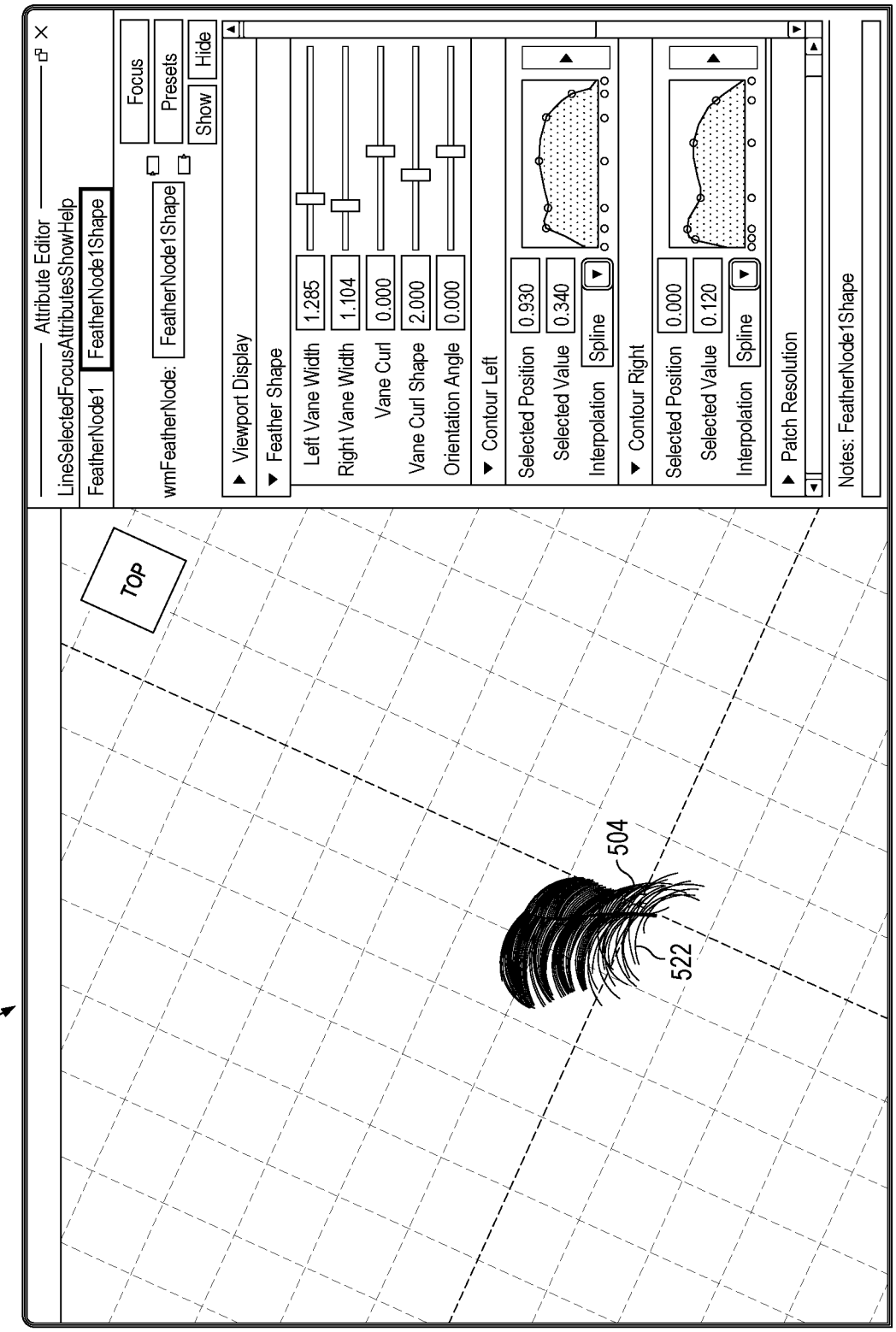
FIG. 5 illustrates a user interface where a feather curl of a feather may be defined using an input via the user interface, in an embodiment.

FIG. 5 illustrates a UI 500 where a feather curl of a feather may be defined using an input via the UI, in an embodiment. As illustrated there, UI 500 may be displayed by a computing device and computing display when generating and modeling feathers for a 3D creature, such as a human, animal, fictional creature, or the like. For example, the computing system may correspond to a computer modeling and animation system configured to generate feathers utilized on a shell, surface, or manifold of a creature (e.g., a body, clothing, armor, or other artifact having a surface associated with the creature). In order to generate such feathers, a digital representation of a computer animation of a feather may be generated in UI 500 based on feathers 204, 304, and 404 in UIs 200, 300, and 400 of FIGS. 2-4, respectively. Thus, UI 500 may show a further progression of the improved UI when modeling a feather for use in computer animation, such as when a curl in a 3D direction is applied to a feather 504.

In this regard, the improved UI 500 is shown from a 3D perspective in a downward direction from a tip of feather 504. This allows a user to view feather 504 in 3D and allows for deformation of feather 504 along another axis to apply a curl 522. The 3D perspective may therefore allow for curling and deformation of feather 504 along a z-axis in a 3D coordinate system. Curl 522 may be applied by selecting a circle, semi-circular curve, or other curvature that should be applied from a spine of feather 504 to the barbs extending in two opposite or approximately opposite directions. Curl 522 may be applied in a uniform direction along the z-axis (as shown in UI 500) or may be applied in different directions as desirable for feather 504. Further, curl 522 may be the same, similar or different in curvature for the barbs on each side of feather 504. In various embodiments, curl 522 may also be applied differently, and have different curvatures, and/or for different localities along the spine of feather 504.

Figure 6:
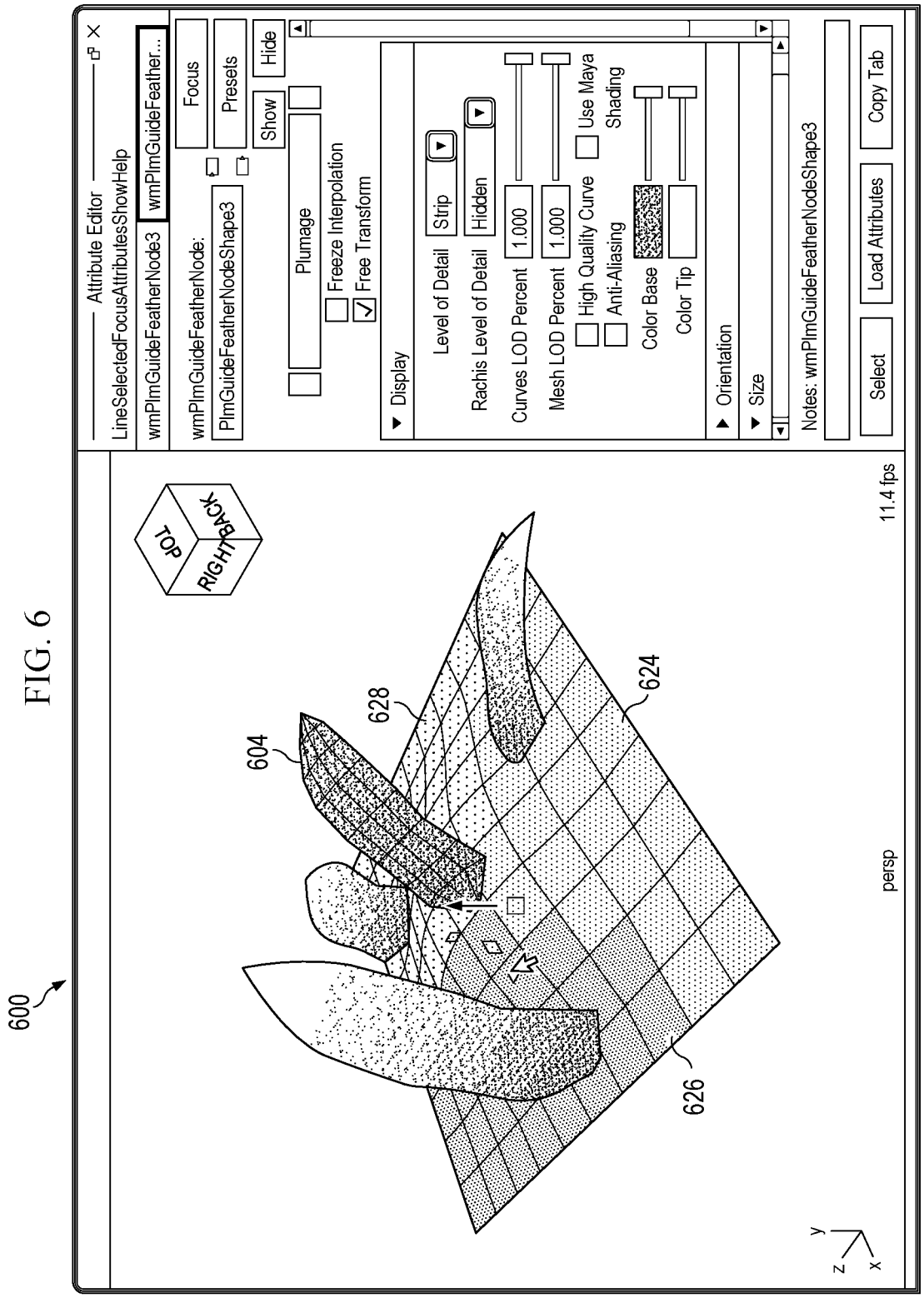
FIG. 6 illustrates a user interface of a manifold for a surface of a 3D creature that may have a placement of objects that avoid intersections, in an embodiment, in an embodiment.

FIG. 6 illustrates a UI 600 of a manifold for a surface of a 3D creature that may have a placement of objects that avoid intersections, in an embodiment. As illustrated there, UI 600 may be displayed by a computing device and computing display when animating a 3D creature, such as a human, animal, fictional creature, or the like. For example, the computing system may correspond to a computer modeling and animation system configured to animate external objects on a surface of a creature. The external objects may correspond to those objects that protrude from the surface of the creature, such as feathers, hairs, fur, and the like. Thus, shown in UI 600 is a partial surface or manifold of a corresponding character, creature, or object, such as a portion of a skin or other anatomy, which may also include external clothing, armor, or the like that may be on or nearby the anatomy of the creature. In various embodiments, a manifold 624 partially shown in UI 600 corresponds to a portion of a computer animated 3D character, animal, or creature having protruding feathers.

In this regard, manifold 624 includes a topological surface 626 that designates the attributes of the partial surface for manifold 624. Manifold 624 may therefore include surface definitions (e.g., as mathematical models and algorithms) that allow for representation of topological surface 626. Manifold 624 may allow for placement of external objects across manifold 624 using the surface definitions of manifold 624, where the external objects may correspond to feathers, hair, fur, scales, and the like, from generated data structures. In further embodiments, manifold 624 may correspond to a ground surface, such as a garden or field surface. In such embodiments, the external objects may instead be different than objects on a surface of a character or creature. For example, the external objects may be plants, flowers, trees, or other objects that may be numerous and similar in size, shape, or appearance such that a "hero" or guide object, including ones similar to the feather generated in UIs 100, 200, 300, 400, and 500, may be used for interpolation of other similar nearby objects during placements. Thus, similar data structures to that generated in UIs 100, 200, 300, 400, and 500 may similarly be used in UI 600.

In order to place the external object on manifold 624 using topological surface 626, one or more attachment points are procedurally placed, dispersed, or scattered in a randomization over topological surface 626 in UI 600. For example, a feather or a hair may be attached at its base to a "follicle" point, which may be a computer modeled point that allows for attachment of a feather. Thus, the arrangement of the attachment points over topological surface 626 for manifold 624 may be randomized but evenly or semi-evenly distributed.

This may allow for placement of feathers or other external objects at attachment points to appear natural and without clumping or baldness. Further, randomization may prevent visible patterns of feather placement, which may appear unnatural. Thereafter, a guide feather 604, such as the one generated via UIs 100, 200, 300, 400, and 500, may be used as the initial feather for growth of a pelt of feathers. Each feather may be represented by the subdivided lattice and corresponding feather from the data structure of guide feather 604. The additional feathers may be generated by interpolating their size, shape, and appearance from the data structure of guide feather 604 and an overall desirable look for the feather groom in UI 600. In this regard, one or more additional tools and/or manifolds may be used to shape, constrain, and/or smooth the feather groom into a desirable overall look. Thus, each interpolated feather over manifold 624 may be generated from the data structure of guide feather 604.

Thus, an initial feather groom may be provided to UI 600 as an input to a computer modeling and animation system for the corresponding 3D character or creature. The feature groom may be used to interpolate feather properties for the growth of feathers on manifold 624. Feather constraints may be applied to each feather generated from the data structure of guide feather 604 so that feather sizes and shapes are maintained and consistent with the input feather groom. Further, these constraints may be used to minimize and/or remove intersections between different feathers, which may be detected from intersections between different portions of adjacent or nearby feathers' lattice structure. In this regard, a surface feature 628 on topological surface 626, such as a curvature or other change in the shape may be used to constrain placement of the feathers interpolated from guide feather 604 to prevent intersections.

For example, the randomization of the placement of attachment points and feathers may be done based on a size, shape, or other characteristic of the feathers. Feathers of larger size and certain shapes may require application point placement and proximity to account for those feathers, such as by increasing distance between randomly placed attachment points. This may assist in preventing intersections between feathers. Conversely, as feather size decreases, placement of attachment points and feathers may become more proximate to provide a fuller appearance to the feather groom. The constraints may also designate angles for growth of feathers from their bases outward. In this regard, a constraint may control the angle at which a feather is grown from its base connected to an attachment point on manifold 624 so that the feather may be oriented at different angles. For example, a feather may be oriented more flatly and parallel to manifold 624 or, conversely, more perpendicularly and protruding from manifold 624. In some embodiments, this may be caused by the size and shape of the feather groom, and input to UI 600, and/or may be based on surface feature 628 of topological surface 626.

Figure 7:
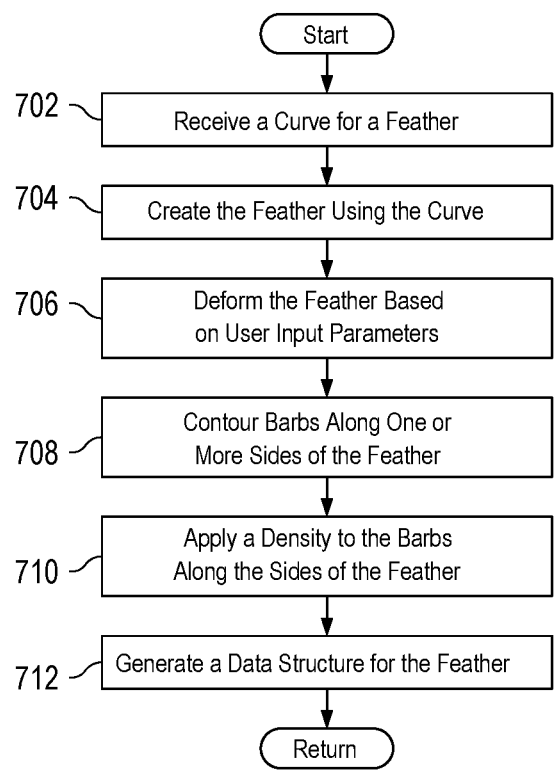
FIG. 7 illustrates a flowchart of an exemplary method as might be performed by computing system when modeling an image and/or animation of digital feather through user interface tools and widgets of a user interface, in an embodiment.

FIG. 7 illustrates a flowchart 700 of an exemplary method as might be performed by computing system when modeling an image and/or animation of digital feather through user interface tools and widgets of a user interface, in an embodiment. Note that one or more steps, processes, and methods described herein of flowchart 700 may be omitted, performed in a different sequence, or combined as desired or appropriate.

In step 702 of flowchart 700, a curve for a feather is received. The curve for the feather may be input as at least two points, with a relationship between the two points, in an improved UI that allows for procedural feather modeling in a simplified and faster manner with fewer user inputs. For example, the curve may be defined as a spline having one or more polynomials defining the curvature of the curve and may include two or more points that constrain the spline. The curve may initially be established but may also be changed and deformed later during feather generation.

At step 704, the feather is created using the curve. When creating the feather, one or more data specifications for template or initial feather configurations may be accessed, such as from a dataset stored in one or more database or data repositories. The data specification may define a shape, thickness, color, and the like of a spine of a feather, which may be procedurally modeled to follow the initial curve input. The data specifications may be used to define an initial number and/or design of barbs along the feather, which may extend in two separate (e.g., opposite or approximately opposite) directions. Further, the initial shape, angle of extension from the spine, color, curvature, and the like of the barbs may also be procedurally generated and modeled along the spine based on the data specifications. Thus, the initial feather generation may be procedural without requiring individual user inputs for each barb, spine, and the like for individual feathers.

At step 706, the feather is deformed based on user input parameters. For example, deformation parameters may be input using a UI widget of the UI. The UI widget may allow for deforming the spine in one or more directions within the UI, such as by adding additional or different curvature to the spine of the feather by moving points and/or changing coordinates of points within the UI. The UI widget may therefore allow entry of deformation parameters that cause the spine of the feather to be deformed from the original input curve.

At step 708, barbs along one or more side of the feather are contoured. Contouring the barbs may include adjusting the length, curvature, and/or angle of protrusion of each individual, or grouping of, feather barbs. This may be done through a simplified UI window, widget, and/or field input. For example, a contouring curve may be drawn or otherwise configured within a window, which may procedurally contour the feather's barbs without requiring individual inputs or changes to the barbs and/or sections of barbs. Thus, the UI may provide a faster and more efficient modeling of the contours of a feather.

At step 710, a density to the barbs is applied along the sides of the feather. A density of the barbs may correspond to a number of barbs along the feather overall, or instead within specific localities along the feather. However, the density may also change individual fibers, such as by making thicker or thinner. The density may also be entered through a simplified UI window, widget, and/or field input. For example, a density curve may be drawn or otherwise configured within a window, which may procedurally change the density of the feather's barbs without requiring individual inputs or changes to the barbs and/or sections of barbs, such as by removing or adding barbs in certain localities and/or by thickening or thinning certain barbs. Thus, the UI may provide a faster and more efficient modeling of the density of a feather.

At step 712, a data structure for, and representing, the feather is generated. The data structure may then be stored in memory, such as in a dataset for guide feathers utilized in a computer modeling and animation system. Later, the data structure may be accessed in order to procedurally generate other features, which may be interpolated from an underlying surface of attachment and feather positions, shapes, and sizes, while reducing intersection between nearby feathers.

Figure 8:
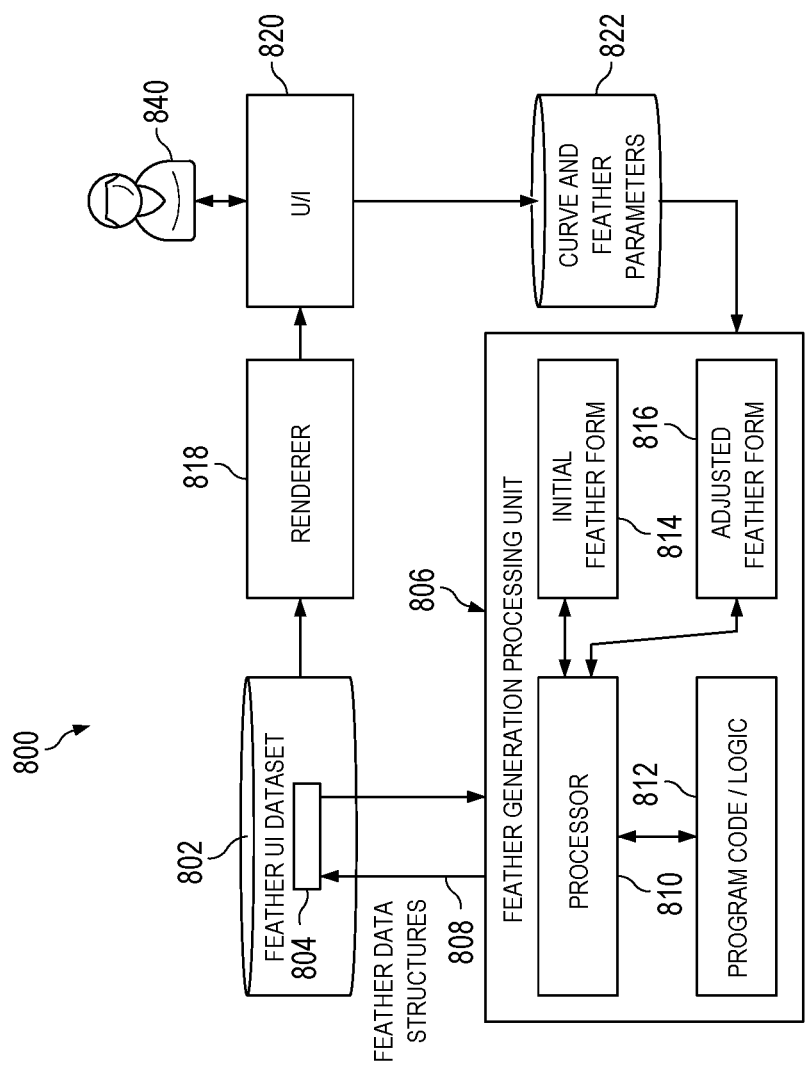
FIG. 8 illustrates a system for generating digital feather growth using an improved user interface during computing modeling, in an embodiment.

FIG. 8 illustrates a system 800 for generating digital feather growth using an improved user interface during computing modeling, in an embodiment. System 800 includes a feather UI dataset 802, a feather generation processing unit 806, a renderer 818, a UI 820, and curve and feather parameters 822.

A user 840 may interact with the UI 820 to define one or more curves and/or feather parameters such that feathers are generated realistically and utilized for placement on a surface and within a feather groom. A feather may therefore correspond to a lattice structure or other external object defined as a data structure that may be placed on or relative to a surface. Curve and feather parameters 822 may indicate, for example, the criteria for feather generation, such as the curvature, polynomials, placement, vertices, and the like of an initial curve, as well as the later deformation of the feather and/or feather spine, contouring and/or density of the feather barbs, and the like. Feather UI dataset 802 may store UI data used to present UI 820, which provides an improved UI for feather generation. Feather UI dataset 802 may also include data for feather lattices and other fibers, which may include data specifications for different selections of feather spine types and appearances, barbs and barb appearance, number of barbs, density of barbs, and the like. Feather UI dataset 802 may be loaded with data from a source of an animation, such as the feather lattice(s) and/or manifold(s) used during animation. Feather UI dataset 802 may also be loaded with data from a source of an animation to designate feathers and other fibers, including guide or target feathers used to grow additional feathers. Feather generation processing unit 806 may utilize the methods and processes described herein to take curve and feather parameters 822 and generate a feather according to input parameters to UI 820 that are presented using feather UI dataset 802. The feather generation processing unit 806 may generate the feather using the feather lattices, input parameters, and the like, as described herein.

Feather generation processing unit 806 includes a processor 810 that executes program code 812 to generate a feather designated in curve and feather parameters 822, such as an initial feather form 814. Feather generation processing unit 806 may generate an adjusted feather form 816 from simplified UI inputs using UI 820. Feather generation processing unit 806 may further store feather data structures 808 to feather UI dataset 802 so that the corresponding data structures may later be used as guide feathers during groom generation. For example, feather generation processing unit 806 may initiate the process by taking curve and feather parameters 822 with initial feather form 814 and generating a digital representation of a feather having adjusted feather form 816. Feather generation processing unit 806 may then output feather data structures 808, which may be included with feather and barb data specifications 804 stored by feather UI dataset 802. Feather generation processing unit 806 may then move to the next feather designated by user 840 and further generate digital feather. The resulting generated and/or constrained feather may be rendered by rendered 818 and/or output to user 840 to inspect the results.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

As one skilled in the art will appreciate in light of this disclosure, certain embodiments may be capable of achieving certain advantages, including some or all of the following: (1) Techniques described and suggested in the present disclosure improve the field of computing, especially the field of digital animation, by improving the computation time to generate and model digital feathers or other external objects that appear as a realistic feather utilized with feather grooms or other computer simulated surfaces. (2) Additionally, techniques described and suggested in the present disclosure improve the efficiency of computing systems by, since the computation time to calculate feather generation is reduced, to compute and render more complex and realistic models in digital animation sequences. (3) Moreover, techniques described and suggested in the present disclosure are necessarily rooted in computer technology in order to overcome problems specifically arising with how to generate feather models and animations using improved UIs to generate realistic feathers, fibers, or other flexible objects within the computational and time constraints of producing a digital animation product.

Figure 9:
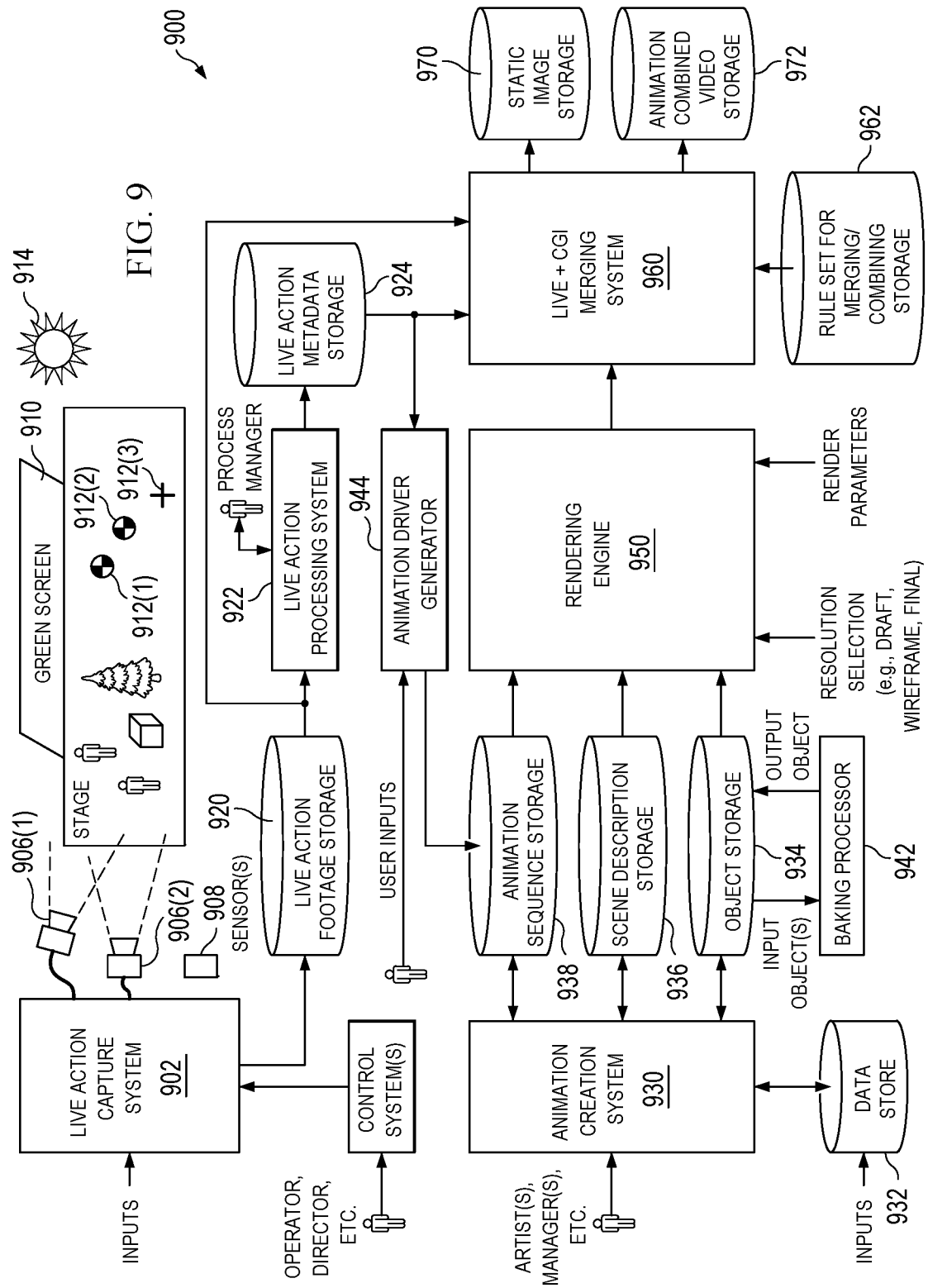
FIG. 9 illustrates an example visual content generation system as might be used to generate imagery in the form of still images and/or video sequences of images, according to various embodiments.

FIG. 9 illustrates an example visual content generation system 900 as might be used to generate imagery in the form of still images and/or video sequences of images. Visual content generation system 900 might generate imagery of live action scenes, computer generated scenes, or a combination thereof. In a practical system, users are provided with tools that allow them to specify, at high levels and low levels where necessary, what is to go into that imagery. For example, a user might be an animation artist and might use visual content generation system 900 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by visual content generation system 900 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or 4096-pixel columns by 2160-pixel rows, or some other resolution. Images might or might not be stored in a certain structured format, but either way, a desired image may be represented as a two-dimensional array of pixel color values. In another variation, images are represented by a pair of stereo images for three-dimensional presentations and in other variations, an image output, or a portion thereof, might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for clarity of description, in some examples, it is assumed that a video frame has one specified display time, but other variations might be contemplated.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. From that, a rendering engine could take all of those as inputs, and compute each of the pixel color values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 9, a live action capture system 902 captures a live scene that plays out on a stage 904. Live action capture system 902 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 906(1) and 906(2) capture the scene, while in some systems, there might be other sensor(s) 908 that capture information from the live scene (e.g., infrared cameras, infrared sensors, motion capture ("mo-cap") detectors, etc.). On stage 904, there might be human actors, animal actors, inanimate objects, background objects, and possibly an object such as a green screen 910 that is designed to be captured in a live scene recording in such a way that it is easily overlaid with computer-generated imagery. Stage 904 might also contain objects that serve as fiducials, such as fiducials 912(1)-(3), that might be used post-capture to determine where an object was during capture. A live action scene might be illuminated by one or more lights, such as an overhead light 914.

During or following the capture of a live action scene, live action capture system 902 might output live action footage to a live action footage storage 920. A live action processing system 922 might process live action footage to generate data about that live action footage and store that data into a live action metadata storage 924. Live action processing system 922 might include computer processing capabilities, image processing capabilities, one or more processors, program code storage for storing program instructions executable by the one or more processors, as well as user input devices and user output devices, not all of which are shown. Live action processing system 922 might process live action footage to determine boundaries of objects in a frame or multiple frames, determine locations of objects in a live action scene, where a camera was relative to some action, distances between moving objects and fiducials, etc. Where elements have sensors attached to them or are detected, the metadata might include location, color, and intensity of overhead light 914, as that might be useful in post-processing to match computer-generated lighting on objects that are computer-generated and overlaid on the live action footage. Live action processing system 922 might operate autonomously, perhaps based on predetermined program instructions, to generate and output the live action metadata upon receiving and inputting the live action footage. The live action footage can be camera-captured data as well as data from other sensors.

An animation creation system 930 is another part of visual content generation system 900. Animation creation system 930 might include computer processing capabilities, image processing capabilities, one or more processors, program code storage for storing program instructions executable by the one or more processors, as well as user input devices and user output devices, not all of which are shown. Animation creation system 930 might be used by animation artists, managers, and others to specify details, perhaps programmatically and/or interactively, of imagery to be generated. From user input and data from a database or other data source, indicated as a data store 932, animation creation system 930 might generate and output data representing objects (e.g., a horse, a human, a ball, a teapot, a cloud, a light source, a texture, etc.) to an object storage 934, generate and output data representing a scene into a scene description storage 936, and/or generate and output data representing animation sequences to an animation sequence storage 938.

Scene data might indicate locations of objects and other visual elements, values of their parameters, lighting, camera location, camera view plane, and other details that a rendering engine 950 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

Animation creation system 930 might be interactive, allowing a user to read in animation sequences, scene descriptions, object details, etc. and edit those, possibly returning them to storage to update or replace existing data. As an example, an operator might read in objects from object storage into a baking processor 942 that would transform those objects into simpler forms and return those to object storage 934 as new or different objects. For example, an operator might read in an object that has dozens of specified parameters (movable joints, color options, textures, etc.), select some values for those parameters and then save a baked object that is a simplified object with now fixed values for those parameters.

Rather than requiring user specification of each detail of a scene, data from data store 932 might be used to drive object presentation. For example, if an artist is creating an animation of a spaceship passing over the surface of the Earth, instead of manually drawing or specifying a coastline, the artist might specify that animation creation system 930 is to read data from data store 932 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 944 might read in live action metadata, such as data representing movements and positions of body parts of a live actor during a live action scene. Animation driver generator 944 might generate corresponding animation parameters to be stored in animation sequence storage 938 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by live action processing system 922. Animation driver generator 944 might convert that movement data into specifications of how joints of an articulated CGI character are to move over time.

A rendering engine 950 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test some interaction or direction, while clarity might be more important than speed for a movie maker to generate data that will be used for final prints of feature films to be distributed. Rendering engine 950 might include computer processing capabilities, image processing capabilities, one or more processors, program code storage for storing program instructions executable by the one or more processors, as well as user input devices and user output devices, not all of which are shown.

Visual content generation system 900 can also include a merging system 960 that merges live footage with animated content. The live footage might be obtained and input by reading from live action footage storage 920 to obtain live action footage, by reading from live action metadata storage 924 to obtain details such as presumed segmentation in captured images segmenting objects in a live action scene from their background (perhaps aided by the fact that green screen 910 was part of the live action scene), and by obtaining CGI imagery from rendering engine 950.

A merging system 960 might also read data from rulesets for merging/combining storage 962. A very simple example of a rule in a ruleset might be "obtain a full image including a two-dimensional pixel array from live footage, obtain a full image including a two-dimensional pixel array from rendering engine 950, and output an image where each pixel is a corresponding pixel from rendering engine 950 when the corresponding pixel in the live footage is a specific color of green, otherwise output a pixel value from the corresponding pixel in the live footage."

Merging system 960 might include computer processing capabilities, image processing capabilities, one or more processors, program code storage for storing program instructions executable by the one or more processors, as well as user input devices and user output devices, not all of which are shown. Merging system 960 might operate autonomously, following programming instructions, or might have a user interface or programmatic interface over which an operator can control a merging process. In some embodiments, an operator can specify parameter values to use in a merging process and/or might specify specific tweaks to be made to an output of merging system 960, such as modifying boundaries of segmented objects, inserting blurs to smooth out imperfections, or adding other effects. Based on its inputs, merging system 960 can output an image to be stored in a static image storage 970 and/or a sequence of images in the form of video to be stored in an animated/combined video storage 972.

Thus, as described, visual content generation system 900 can be used to generate video that combines live action with computer-generated animation using various components and tools, some of which are described in more detail herein. While visual content generation system 900 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

One embodiment might include a carrier medium carrying image data or other data having details generated using the methods described herein. The carrier medium can comprise any medium suitable for carrying the image data or other data, including a storage medium, e.g., solid-state memory, an optical disk or a magnetic disk, or a transient medium, e.g., a signal carrying the image data such as a signal transmitted over a network, a digital signal, a radio frequency signal, an acoustic signal, an optical signal or an electrical signal.

Figure 10:
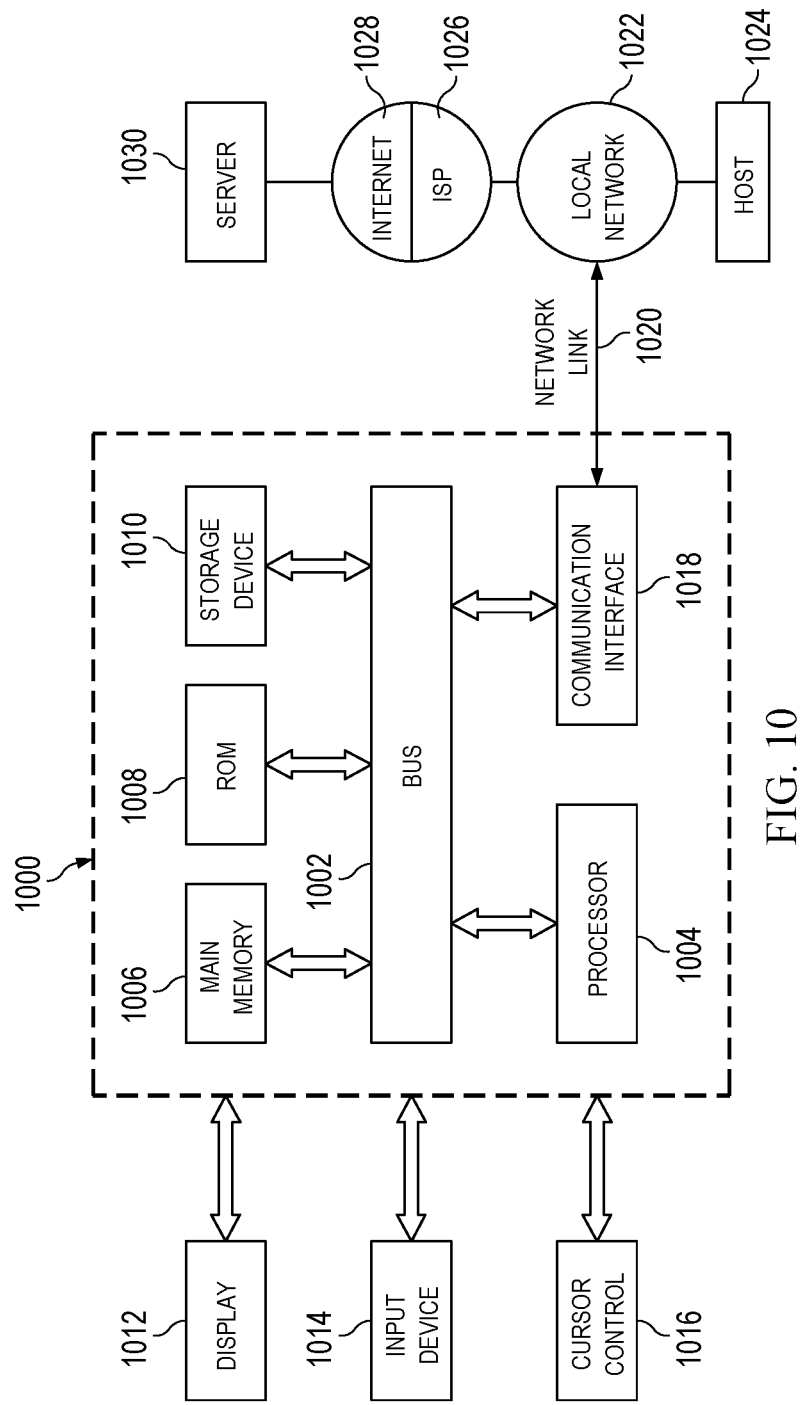
FIG. 10 illustrates a block diagram illustrating an example computer system upon which computer systems of the systems illustrated in FIGS. 1 and 9 may be implemented.

FIG. 10 illustrates a block diagram that illustrates a computer system 1000 upon which the computer systems of the systems described herein and/or visual content generation system 900 (see FIG. 9) may be implemented. Computer system 1000 includes a bus 1002 or other communication mechanism for communicating information, and a processor 1004 coupled with bus 1002 for processing information. Processor 1004 may be, for example, a general-purpose microprocessor.

Computer system 1000 also includes a main memory 1006, such as a random-access memory (RAM) or other dynamic storage device, coupled to bus 1002 for storing information and instructions to be executed by processor 1004. Main memory 1006 may also be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a computer monitor, for displaying information to a computer user. An input device 1014, including alphanumeric and other keys, is coupled to bus 1002 for communicating information and command selections to processor 1004. Another type of user input device is a cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a network connection. A modem or network interface local to computer system 1000 can receive the data. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be a network card, a modem, a cable modem, or a satellite modem to provide a data communication connection to a corresponding type of telephone line or communications line. Wireless links may also be implemented. In any such implementation, communication interface 1018 sends and receives electrical, electromagnetic, or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world-wide packet data communication network now commonly referred to as the "Internet" 1028. Local network 1022 and Internet 1028 both use electrical, electromagnetic, or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020, and communication interface 1018. In the Internet example, a server 1030 might transmit a requested code for an application program through the Internet 1028, ISP 1026, local network 1022, and communication interface 1018. The received code may be executed by processor 1004 as it is received, and/or stored in storage device 1010, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for realistic surface object generation via a user interface on a modeling system, the method comprising:
   under the control of one or more computer systems configured with executable instructions:
      receiving, from an input to the user interface of the modeling system, a curve defining a line of a surface object;
      generating the surface object in the user interface based at least on the curve, wherein the surface object comprises structures extended away from the line of the surface object in one or more directions;
      deforming the surface object, to form a deformed surface object data object, based on one or more deformation parameters received via the user interface; and
      generating a data structure representing the surface object based on the deformed surface object data object and the structures extended away from the line.

2. The computer-implemented method of claim 1, wherein, before generating the data structure, the computer-implemented method further comprises:
   applying a surface object curl to the structures along the line of the surface object based on a curl parameter received via the user interface, wherein the surface object curl comprises a curvature of the structures is a uniform direction along the line.

3. The computer-implemented method of claim 1, further comprising:
   generating a surface object contour of the structures along at least one of the one or more directions based on a contour parameter defining the surface object contour received via the user interface; and
   establishing a structure density for a number of the structures along the line of the surface object based on a structure density parameter received via the user interface,
   wherein the data structure is further generated based on the surface object contour and the structure density.

4. The computer-implemented method of claim 3, wherein, after establishing the structure density and before generating the data structure, the computer-implemented method further comprises:
   adjusting the structure density at different points along the surface object based on a plurality of additional structure densities received via the user interface, wherein adjusting the structure density changes a sparseness of the number of the structures at the different points along the surface object.

5. The computer-implemented method of claim 1, wherein the one or more deformation parameters are received using a user interface widget tool that deforms the surface object in at least two-dimensions in the user interface, and wherein the one or more deformation parameters define at least one of the curve defining the line, a tip of the surface object, or a base of the surface object.

6. The computer-implemented method of claim 1, wherein the curve defining the line of the surface object comprises a spline, and wherein the structures comprise one or more structure directions depending on an area along the surface object.

7. The computer-implemented method of claim 1, wherein the surface object comprises a guide surface object for a surface object design having a plurality of surface objects, and wherein the computer-implemented method further comprises:
   generating the plurality of surface objects based at least on the data structure representing the guide surface object and placements of the plurality of surface objects on a manifold associated with the surface object design.

8. The computer-implemented method of claim 7, wherein the placements are randomized over the manifold to minimize intersections between the plurality of surface objects, and wherein randomization is based on surface object sizes of the plurality of surface objects and a proximity of each of the plurality of surface objects to other ones of the plurality of surface objects.

9. A system comprising: at least one processor, and a storage medium storing instructions, which when executed by the at least one processor, cause the system to implement the computer-implemented method of claim 1.

10. A non-transitory computer-readable storage medium storing instructions, which when executed by at least one processor of a computer system, causes the computer system to carry out the computer-implemented method of claim 1.

11. A non-transitory computer-readable medium carrying instructions, which when executed by at least one processor of a computer system, causes the computer system to carry out the computer-implemented method of claim 1.

12. A non-transitory carrier medium carrying data that includes information generated according to the computer-implemented method of claim 1.

13. A computer system for realistic animated object generation via a user interface on a modeling system, the computer system comprising:
   at least one processor; and
   a computer-readable medium storing instructions, which when executed by the at least one processor, causes the computer system to perform operations comprising:
      receiving, from an input to the user interface of the modeling system, a curve defining a central line of an animated object;
      generating the animated object in the user interface based at least on the curve, wherein the animated object comprises structures extended away from the central line of the animated object in one or more directions;
      deforming the animated object, to form a deformed animated object, based on one or more deformation parameters received via the user interface; and
      generating a data structure representing the animated object based on the deformed animated object, an animated object contour, and a structure density.

14. The computer system of claim 13, wherein, before generating the data structure, the operations further comprise:
   applying an animated object curl to the structures along the central line of the animated object based on a curl parameter received via the user interface, wherein the animated object curl comprises a curvature of the structures is a uniform direction along the central line.

15. The computer system of claim 13, further comprising:
   generating the animated object contour of the structures along at least one of the one or more directions based on a contour parameter defining the animated object contour received via the user interface establishing the structure density for a number of the structures along the central line of the animated object based on a structure density parameter received via the user interface, wherein the data structure is further generated based on the animated object contour and the structure density.

16. The computer system of claim 15, wherein, wherein, after establishing the structure density and before generating the data structure, the operations further comprise:

adjusting the structure density at different points along the animated object based on a plurality of additional structure densities received via the user interface, wherein adjusting the structure density changes a sparseness of the number of the structures at the different points along the animated object.

17. The computer system of claim 13, wherein the one or more deformation parameters are received using a user interface widget tool that deforms the animated object in at least two-dimensions in the user interface, and wherein the one or more deformation parameters define at least one of the curve defining the central line, a tip of the animated object, or a base of the animated object.

18. The computer system of claim 13, wherein the curve defining the central line of the animated object comprises a spline, and wherein the structures comprise one or more structure directions depending on an area along the animated object.

19. The computer system of claim 13, wherein the animated object comprises a guide animated object for a character or a creature having a plurality of animated objects, and wherein the operations further comprise:

generating the plurality of animated objects based at least on the data structure representing the guide animated object and placements of the plurality of animated objects on a manifold associated with the character or the creature.

20. The computer system of claim 19, wherein the placements are randomized over the manifold to minimize intersections between the plurality of animated objects, and wherein randomization is based on animated object sizes of the plurality of animated objects and a proximity of each of the plurality of animated objects to other ones of the plurality of animated objects.

* * * * *